United States Patent

Holcomb et al.

[15] 3,703,095
[45] Nov. 21, 1972

[54] APPLANATION TONOMETER

[72] Inventors: Harry F. Holcomb; Miguel Martinez, both of Baltimore, Md.

[73] Assignee: The Johns Hopkins University

[22] Filed: March 10, 1970

[21] Appl. No.: 18,182

[52] U.S. Cl. .................................73/80, 128/2 T
[51] Int. Cl. ............................................A61b 3/16
[58] Field of Search ..........................73/80; 128/2 T

[56] References Cited

UNITED STATES PATENTS

| | | | |
|---|---|---|---|
| 3,049,001 | 8/1962 | Mackay et al. | 73/80 |
| 3,338,089 | 8/1967 | Coombs et al. | 73/80 |
| 3,338,090 | 8/1967 | Coombs et al. | 73/80 |
| 3,359,789 | 12/1967 | Forge | 73/80 |

FOREIGN PATENTS OR APPLICATIONS 158,045  10/1963   U.S.S.R. .......................73/80

OTHER PUBLICATIONS

RCA tn 602 ecember 1964

Primary Examiner—James J. Gill
Assistant Examiner—Charles E. Snee, III
Attorney—Walter G. Finch

[57] ABSTRACT

An electric applanation type tonometer of the all solid state type is provided. A signal null indicative of a desired applanation triggers an electronic switch which takes a reading of a pressure signal. This pressure signal is stored and read out for several minutes after removal of the instrument from the eye.

10 Claims, 6 Drawing Figures

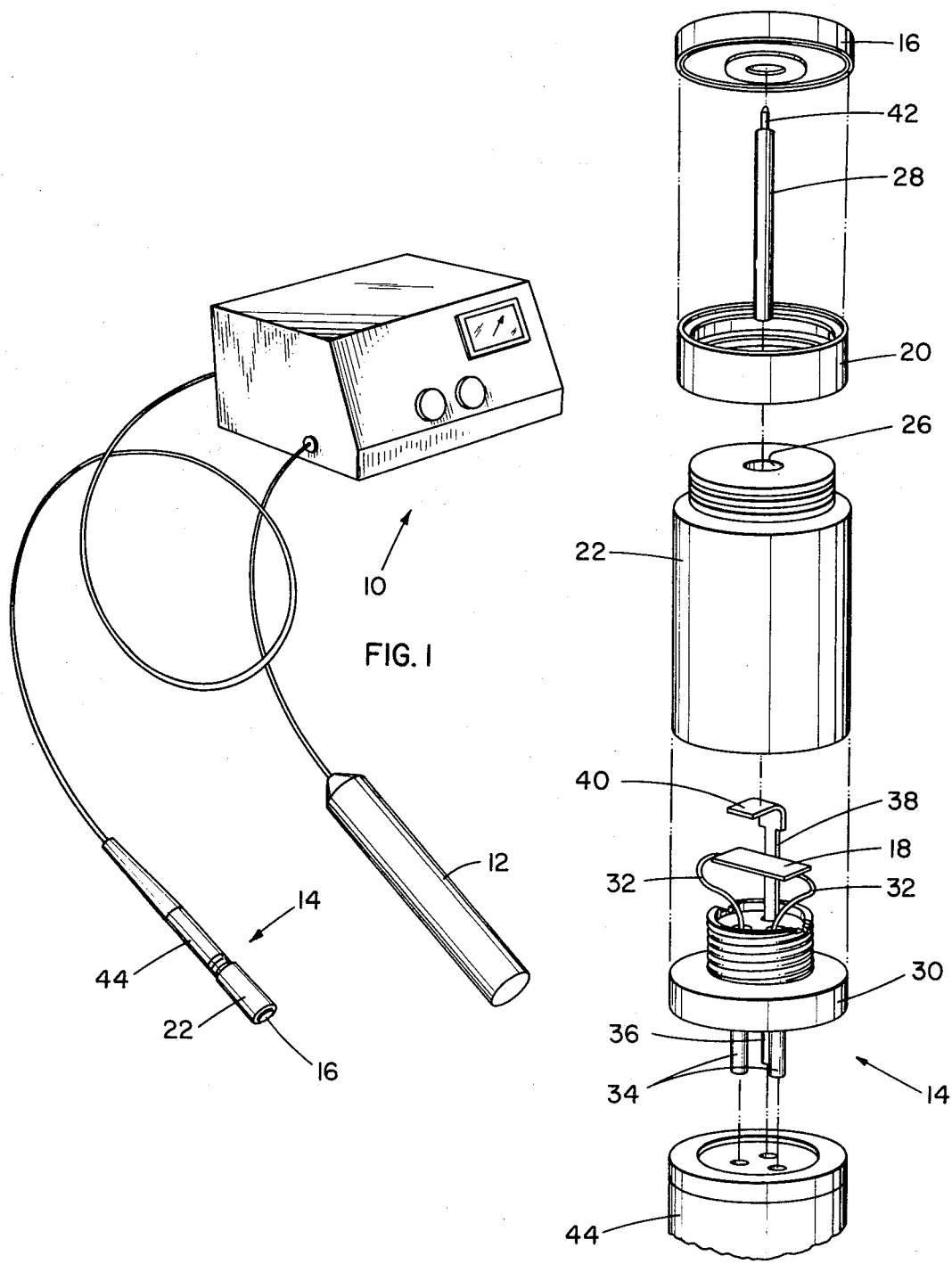

APPLANATION TONOMETER

This invention relates generally to medical diagnostic instruments, and more particularly it pertains to all-electric tonometers of the applanation type.

The operation of this instrument for the indirect measurement of intraocular pressure depends upon the Fick principle whereby $P = F/A$, where $P =$ pressure, $F =$ force, and $A =$ area. This principle has been the basis of operation of all tonometers of the applanation type, i.e., all tonometers which deform the cornea by flattening a portion of it.

In utilizing the Fick principle, the assumption is made that the cornea represents a boundary of the fluid contents of the eye, and has a negligible rigidity of its own. Applanation tonometers are capable of simultaneously measuring the applanated area of the cornea, and the force required to applanate a given area against the resistance of the intraocular pressure. Different means of computing the pressure, i.e., $F/A$ are incorporated in the calibration of a given instrument.

It is an object of this invention, therefore, to provide an improved tonometer probe which determines both the applanation area and pressure in electrical terms.

Another object of this invention is to provide a probe and electrical circuitry whereby the pressure signal is read and stored by a memory circuit upon the action of an electronic switch which operates upon achievement of predetermined null derived from the area signal.

Still another object of this invention is to provide an electronic applanation type tonometer which is more reliable and sensitive than heretofore.

Other objects and attendant advantages of the invention will become more readily apparent and understood from the following detailed specification and accompanying drawings in which:

FIG. 1 is a perspective view showing the improved applanation tonometer of this invention;

FIG. 2 is an exploded view, outer sleeve removed, showing components of the probe for use with the applanation tonometer of FIG. 1;

Figure 4A:
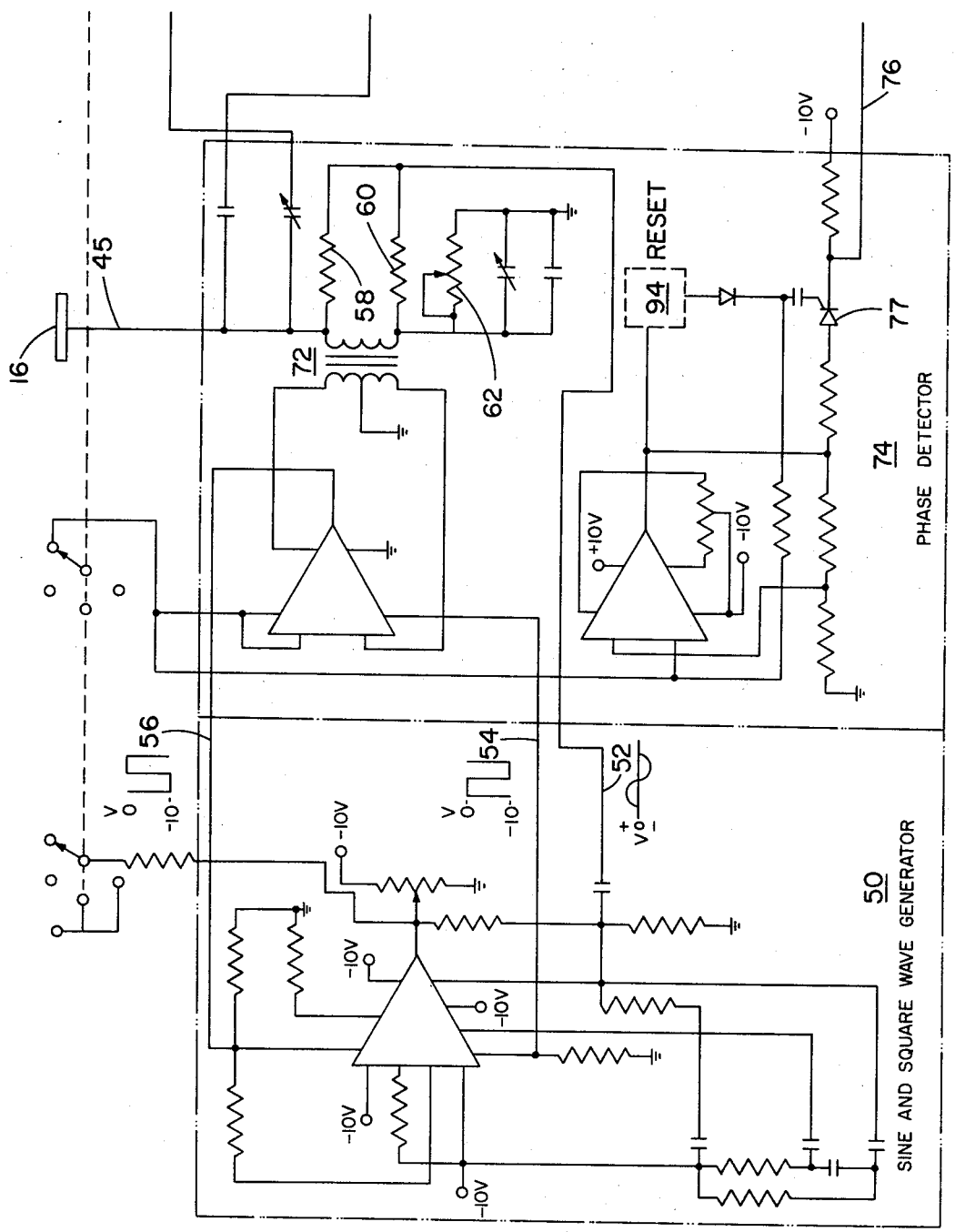
Figure 4B:
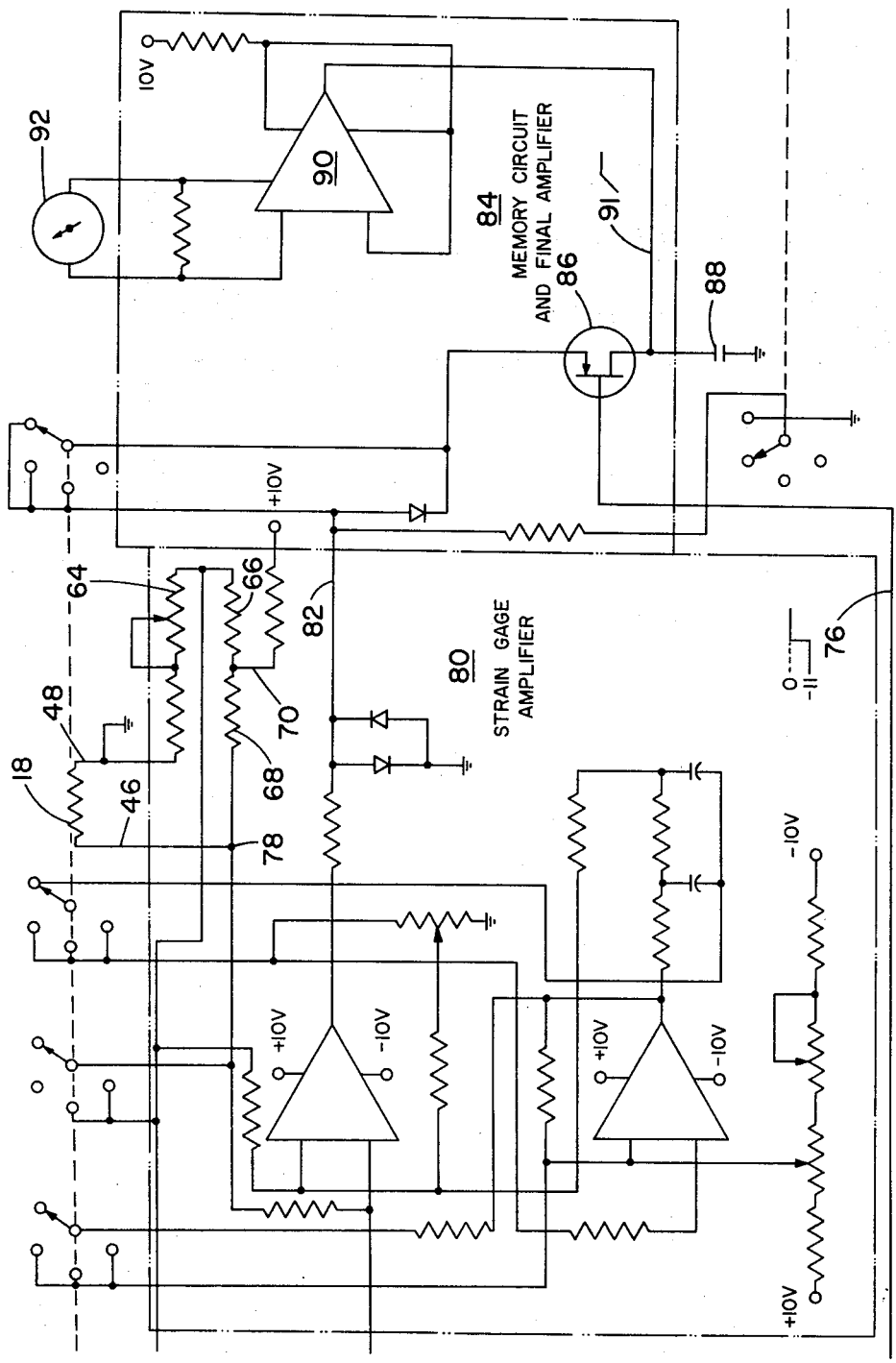
Figure 4C:
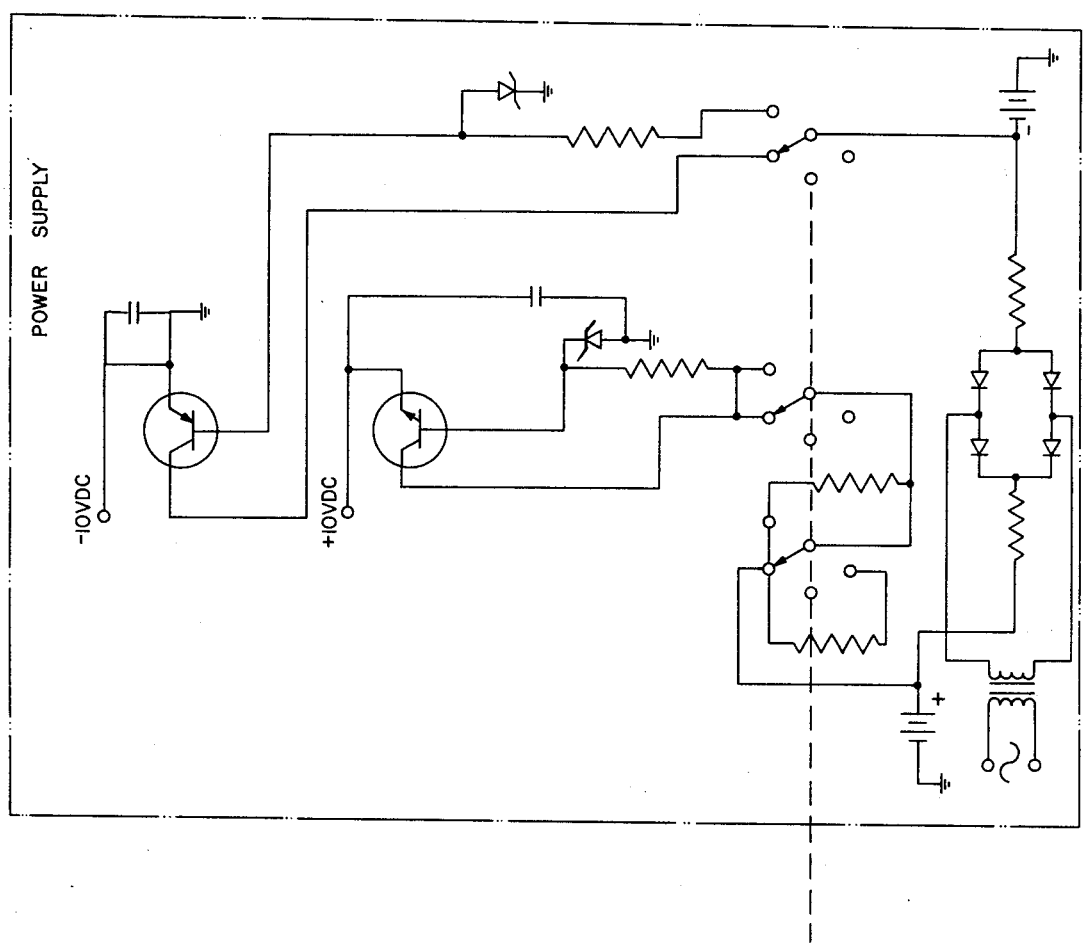

FIGS. 4A, 4B, and 4C are electrical schematic diagrams of three consecutive parts showing the circuitry for use with the improved tonometer probe.

With reference now to FIG. 1 of the drawings, reference numeral 10 indicates generally a control box containing the measurement circuitry. Reference numeral 12 indicates a hand held grounding electrode or grip for the patient. Reference numeral 14 indicates a probe which is applied to the eye to derive the two necessary signals representative of applanation and force.

Figure 3:
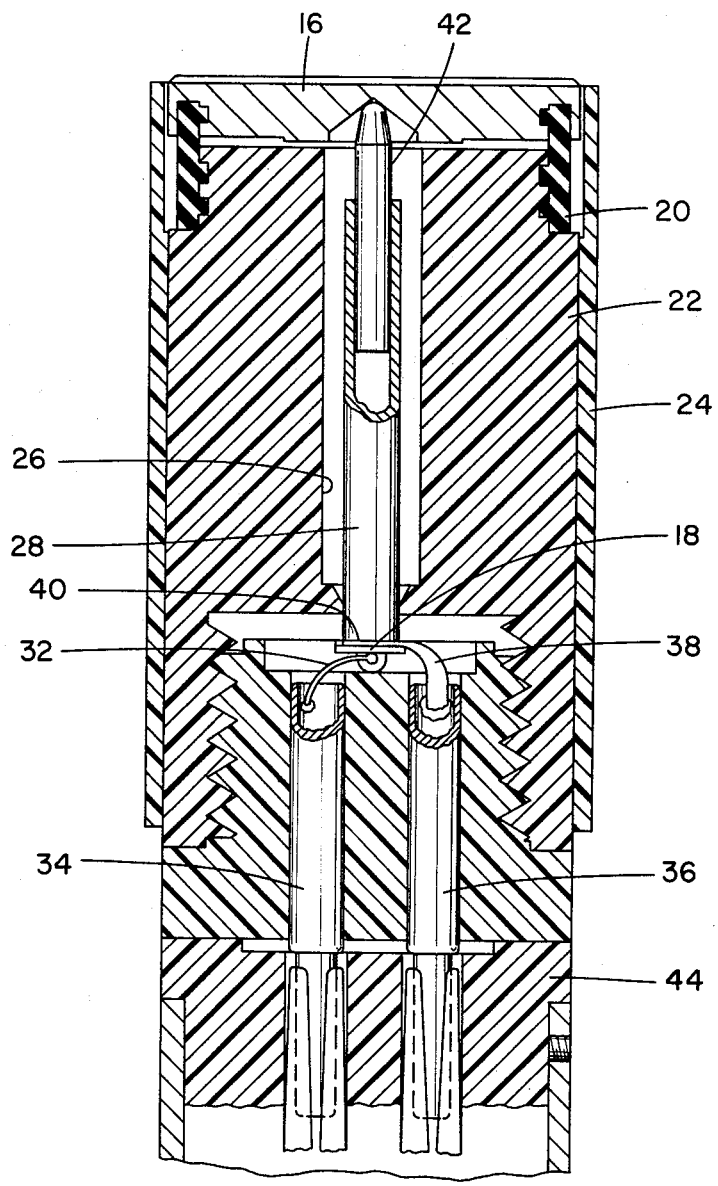
FIG. 3 is a vertical section taken on the assembled probe of FIG. 2.

The area of applanation is measured as an electrical impedance through a metal based disc 16 of semi-conductive ferrite as shown in FIGS. 2 and 3. This disc 16 will become an arm of a Wheatstone bridge in circuitry later to be described. The force of applanation is simultaneously measured by a glass based semi-conductor strain gage 18 which is in mechanical contact with the disc 16, but electrically isolated from it.

The disc 16 is mounted on a soft rubber member 20 in the end of a plastic cylindrical body 22 within a protective sleeve 24 of the probe 14 and protrudes slightly therefrom. The body 22 is provided with a clearance bore 26 centrally therethrough to accommodate an adjustable length plunger 28.

A circular base 30 of plastic is threaded for assembly to the body 22 and it supports strain gage 18 which is mounted on its top with glass side upward. The electrical leads 32 of the strain gage 18 are connected to a pair of connector pins 34. A third pin 36 is soldered to a strap member 38 of platinum wire thinly flattened and bent over at free end 40. When assembled, this free end 40 rests upon the center of the glass base of the strain gage 18.

The plunger 28 seats upon the end 40 and makes electric contact therewith. Further, any force lengthwise of the plunger 28 is transmitted through this thin flexible end 40 to the strain gage 18 without interference. The other end of plunger 28 is provided with an adjustable length point 42 which is preset during assembly of the probe 14 so as to make both electrical and mechanical contact with the metallic base of the disc 16 without destroying the cushioning effect of the soft rubber mounting member 20. The other or return electrical connection required for the disc 16 will be through the body of the patient to the grip 12 held in his hand.

The probe 14 plugs into a three connector socket 44 which connects to the control box 10 with flexible shielded leads. The lead from the pin 36, ferrite plate electrical connection, is shown in FIG. 4A as reference numeral 45. The grip 12, patient's body, is connected by separate lead to ground of the circuitry in box 10.

The leads from the pins 34 of strain gage 18 are shown as reference numerals 46 and 48 in FIG. 4B.

An alternating current generator 50 provides 8 KHz sine wave output 52 and two square wave outputs 54 and 56, which as shown in FIG. 4A are 180° out of phase. The sine wave output 52 supplies two arms of a bridge circuit 58 and 60 and the ferrite disc 16 and reference 62 from the other two arms.

Direct current at point 70 supplies a bridge circuit having two arms 64, 66 and the strain gage 16 and reference 68 form the other two arms as shown in FIG. 4B.

The AC signal from the first mentioned bridge circuit 58, 60, 62 for the ferrite disc 16 is fed through a split secondary transformer 72 and amplified and converted to a step function by a phase detector circuit 74. The step function wave occurs at a null of these bridge components and appears on output lead 76 generated by the action of triggered semi-conductor switch 77 in FIG. 4A.

The bridge circuit 64, 66, etc., for the strain gage 18 develops a DC signal at point 78 which is amplified by a strain gage amplifier 80 and delivered at an output lead 82 as shown in FIG. 4B.

These two output leads 76 and 82 go to a memory circuit and a final amplifier 84 which includes a field effect transistor switch 86 and a low leakage, preferably polystyrene, storage capacitor 88. The transistor 86 is always in the "on" condition until turned "off" by the signal from the phase detector 74. Prior to the "off" signal, the amplified DC signal from the strain gage amplifier 80 charges the capacitor 88. This voltage 91 is stored on capacitor 88 and is amplified by a very high impedance integrated circuit such as a GI MCM 550 amplifier 90 and is readout on a meter 92.

This reading on meter 92 is proportional to the deflection of the strain gage 16 at the moment of predetermined balance of the ferrite disc bridge 58, 60, etc., and corresponds to the force obtained at a desired applanation of the eye. The reading on meter 92 persists for several minutes after removal of the instrument from the eye permitting the operator to transfer his attention from the patient to the control box at his convenience. The reading is canceled by depressing a pushbutton 94.

FIG. 4C shows a voltage regulated power supply with battery charger suggested for use with the applanation tonometer circuitry above described.

Obviously many modifications and variations of the present invention are possible in light of the above teachings. It is, therefore, to be understood that within the scope of the appended claims the invention may be practiced otherwise than as specifically described.

What is claimed is:

1. An electric applanation tonometer, comprising, a probe having a single electrode disc for mechanically and electrically contacting a patient's eye by wetting and varying electrical resistance in accordance with the area of said eye contacted, strain gage means, means coupling said disc with said strain gage means and relaying force to said strain gage means of said eye contacted, electrical means for powering said disc and deriving an area signal therefrom, means connectable electrically to another portion of said patient for connecting one side of said disc-powering electrical means to said disc through said patient, electrical means for powering said strain gage means and deriving a force signal therefrom, electrical means for relating said area signal and said force signal, and means for indicating said force signal at a solely desired area signal, said wet contacting disc varying the electrical resistance in accordance with the area of said eye contacted and by control of current flow through said patient.

2. An electric applanation tonometer as recited in claim 1, wherein said disc is resiliently supported in said probe, and said means for coupling said disc with said strain gage means consists of an elongated plunger adjustable lengthwise for mechanically coupling said resiliently supported disc with said strain gage means.

3. An electric applanation tonometer as recited in claim 1, wherein said means for powering said disc and deriving an area signal therefrom includes a resistance bridge circuit having an alternating current supply, with said disc, said wetted area and the body of said patient forming one of the resistance arms of said bridge circuit for deriving the area signal from said eye, said alternating current supply supplying current to said bridge so that the varying resistance of said disc, said wetted area and the body of said patient alters the conditions of said bridge to indicate the applanated area.

4. An electric applanation tonometer as recited in claim 1, wherein said means for powering said strain gage means and deriving a force signal therefrom includes a bridge circuit having a direct current supply, with the strain gage of said strain gage means forming one of the arms thereof for deriving said force signal, said direct current supply supplying current to said bridge so that variations of said strain gage alter the condition of the bridge to indicate variations in the force signal.

5. An electric applanation tonometer as recited in claim 1, wherein said electrical means for relating said area signal and said force signal includes a semi-conductor switching circuit operable in response to the varying resistance of said disc, said wetted area and the body of said patient and having a triggered semi-conductor stepped generator actuated when said varying resistance reaches a value representative of said desired area thereby controlling the operation of a switchable transistor, with said switchable transistor controlling the path of force signal to the indicating means to indicate the force when the desired area of the eye is contacted by the disc.

6. An electric applanation tonometer as recited in claim 1, wherein said means for indicating said force signal at a solely desired area signal includes an indicating meter, an amplifier circuit for amplifying said force signal to said indicating meter, and a memory circuit responsive to said force signal for developing a potential level representative of said force signal and electrically coupled to said amplifying circuit for holding said potential level representative of said force signal on said indicator meter.

7. An electric applanation tonometer as recited in claim 2, wherein said means for powering said disc and deriving an area signal therefrom includes a resistance bridge circuit having an alternating current supply with said disc, said wetted area and the body of said patient forming one of the resistance arms of said bridge circuit for deriving the area signal from said eye, said alternating current supply supplying current to said bridge so that the varying resistance of said disc, said wetted area and the body of daid patient alters the conditions of said bridge to indicate the applanated area.

8. An electric applanation tonometer as recited in claim 7, wherein said means for powering said strain gage means and deriving a force signal therefrom includes a bridge circuit having a direct current supply, with the strain gage of said strain gage means forming one of the arms thereof for deriving said force signal, said direct current supply supplying current to said bridge so that variations of said strain gage alter the condition of the bridge to indicate variations in the force signal.

9. An electric applanation tonometer as recited in claim 8, wherein said electrical means for relating said area signal and said force signal includes a semi-conductor switching circuit operable in response to the varying resistance of said disc, said wetted area and the body of said patient and having a triggered semi-conductor stepped generator actuated when said varying resistance reaches a value representative of said desired area thereby controlling the operation of a switchable transistor, with said switchable transistor controlling the path of force signal to the indicating means to indicate the force when the desired area of the eye is contacted by the disc.

10. An electric applanation tonometer as recited in claim 9, wherein said means for indicating said force signal at a solely desired area signal includes an indicating meter, an amplifier circuit for amplifying said force signal to said indicating meter, and a memory circuit responsive to said force signal for developing a potential level representative of said force signal and electrically coupled to said amplifying circuit for holding said potential level representative of said force signal on said indicator meter.

* * * * *